United States Patent [19]

Ronzoni

[11] Patent Number: 5,113,729
[45] Date of Patent: May 19, 1992

[54] CLAMPING DEVICE FOR FIXING A SPINDLE SLEEVE ON THE PLATFORM OF AN AUTOMATIC MACHINE TOOL

[75] Inventor: Enrico Ronzoni, Bergamo, Italy

[73] Assignee: Gildemeister Italiana S.p.A., Brembate Sopra, Italy

[21] Appl. No.: 557,404

[22] Filed: Jul. 23, 1990

[30] Foreign Application Priority Data

Oct. 20, 1989 [IT] Italy .................. 22077 A/89

[51] Int. Cl.⁵ .................. B23B 21/00; B23B 29/00
[52] U.S. Cl. .................. 82/137; 82/138; 409/231
[58] Field of Search .................. 82/137-139, 82/158-161, 120, 121; 29/40, 41; 409/241, 209, 231-233; 403/234, 235, 344; 279/28, 29, 76-78, 83-87, 97, 99, 34

[56] References Cited

U.S. PATENT DOCUMENTS

| | | | |
|---|---|---|---|
| 4,215,961 | 8/1980 | Babel | 409/241 X |
| 4,275,625 | 6/1981 | Tomlinson | 82/129 X |
| 4,622,874 | 11/1986 | Trautmann | 82/137 |

Primary Examiner—Larry I. Schwartz
Assistant Examiner—J. R. Daulton
Attorney, Agent, or Firm—Ladas & Parry

[57] ABSTRACT

Clamping device for fixing a spindle sleeve (2) on the carrying platform (1) of an automatic machine tool by interposing a concave carrying slide (3) and using clamping strips (5) which are arranged laterally with respect to the spindle-carrying sleeves and are inserted into a corresponding recess (4) of the spindle-carrying sleeve (2) and secured by means of screws (5a) on the associated slide (3). The spindle-carrying sleeve (2) is moreover secured on the associated slide (3) by means of screws (2a) provided inside threaded holes (9) along the centre line on the bottom of the concave slide (3). Adjusting devices (8) are arranged in retaining strips (6) for fixing the concave slides (3) on the platform (1).

6 Claims, 2 Drawing Sheets

CLAMPING DEVICE FOR FIXING A SPINDLE SLEEVE ON THE PLATFORM OF AN AUTOMATIC MACHINE TOOL

The above invention relates to a device for fixing a spindle-carrying sleeve on the platform of an automatic machine tool, of the type mentioned in the preamble of claim 1.

In particular in multiple-spindle lathes, supporting of tool spindles is effected in a platform forming an oblong body and having a polygonal, for example hexagonal cross-section. The platform has on its circumference semicircular recess, a concave slide for mounting a carrying sleeve for a tool spindle being provided in each of these recesses. The carrying slides are secured along their longitudinal sides on the body of the platform and the spindle-carrying sleeve is mounted in the concave guide by means of securing means.

A device of this kind is described in U.S. Pat. No. 4,622,874, in which securing of the concave slides on the body of the platform is effected using stirrup-shaped securing parts. Mounting of each carrying sleeve in the concave guide is effected by means of clamping bands, clamps or clamping clips which surround the spindle-carrying sleeve to be secured, the clamping bands or clamping clips being secured at their ends on the associated concave guide by screw connections. The embodiment described in the prior-published U.S. Pat. No. 4,622,874 has various disadvantages.

Securing of the spindle-carrying sleeve and the concave guide is effected exclusively via clamping bands or clamping clips acting in the circumferential direction. The latter must, for strength reasons, have a corresponding material thickness, which results in large clamping forces having to be applied. The application of large clamping forces in the circumferential direction of the spindle sleeve leads, however, to deformations of the body of the spindle-carrying sleeve, which in turn has a disadvantageous effect on the supporting arrangement of the tool spindle. In order to obtain sufficient and uniform coupling rigidity in the axial direction between carrying sleeve and concave slide, it is necessary moreover to provide a plurality of these clamping bands or jaws arranged at intervals. The clamping bands must have a hook-shaped formation at their ends for engaging into corresponding profiled grooves of the concave guide. When clamping clips are used, these moreover must be very precisely machined on their side directed towards the sleeve. The arrangement of a recess or longitudinal groove for engagement of the clamping clip on the concave guide requires moreover an extension of the slide body in the circumferential direction, with consequent greater outlay on material and higher production costs. Where the bands are directly secured and clamped by means of a screw connection engaging with the concave guide, additional machining of the spindle-carrying sleeve is necessary in order to create milled areas required for arrangement of the screws in the immediate vicinity of the sleeve. Moreover, in the clamping jaws, special recesses must be machined for the heads of the securing screws, since the screw shafts have an inclined arrangement. Moreover, in order to achieve a good securing arrangement when using the known clamping bands, a good connection between these clamping bands and the spindle-carrying sleeve is necessary. For this purpose, the connecting surfaces provided therefor must also be precisely machined, an operation which further increases the overall costs of the device.

During assembly and clamping of the known spindle-carrying sleeves, it is necessary, moreover, to adjust repeatedly the individual screw connections in order to compensate for give in the material or changes in shape of the spindle sleeve. These compensating operations must be carried out for each individual carrying sleeve of the automatic machine tool, for example a multiple-spindle lathe, resulting in long setting-up times, thus negatively influencing the productivity of the high-investment machine tools and increasing the costs per part.

The object of the above invention is to propose a clamping device for spindle-carrying sleeves, which is able to overcome the disadvantages of the prior art and allows the abovementioned spindle-carrying sleeve to be rapidly mounted in the concave longitudinal slide provided for this purpose, and in particular using a limited number of components which can be easily manufactured, and the clamping operation to be performed with locally limited stressing of the sleeve so as to avoid deformation and damaging of the spindle-carrying sleeve and at the same time achieve a simplified design for the concave guiding slides.

The object according to the invention is achieved with a clamping device which is characterized in that:

a) each spindle-carrying sleeve has on its lower zones located next to each other in the assembled state, along the edges of the concave slide, at least one receiving seat for a clamping strip and this clamping strip is removably secured on the associated slide by means of a screw connection, b) the pressure pieces secured on the platform are strip-shaped and have an adjusting device which acts on the adjacent edge of the associated concave slide by means of a screw actuatable from the outside, and c) along the centre line on the bottom of the concave slide there are provided threaded holes for receiving screws provided in the spindle-carrying sleeve.

Further features of the invention are described in the subclaims and the following description.

With the clamping device according to the invention various important advantages are achieved. Firstly the device can be manufactured simply and with few components. Assembly of the individual components is performed extremely rapidly and the clamping operation is effected uniformly and in particular over the entire longitudinal extension of the spindle-carrying sleeve. Deformations of the sleeve and vibrations on the tool, as well as chatter marks during the machining operation, are thus entirely eliminated. The external surface of the spindle-carrying sleeve may have any machined finish desired. Advantageously the spindle-carrying sleeve is not stressed by undesired and disadvantageous clamping forces in the circumferential direction of the sleeve, so that damaging or undesired deformations of the spindle-carrying sleeve, or of the components located inside the sleeve, is entirely eliminated. The construction of the concave guide, i.e. of the edges of the guide, is also simplified.

Further features, advantages and details of the clamping device according to the invention for fixing a spindle-carrying sleeve on the tool-carrying platform of a machine tool, in particular of an automatic multiple-spindle lathe, are now described in the following description with reference to the accompanying drawings. In the drawings an example of embodiment of the clamping device according to the invention is illustrated.

Figure 1:
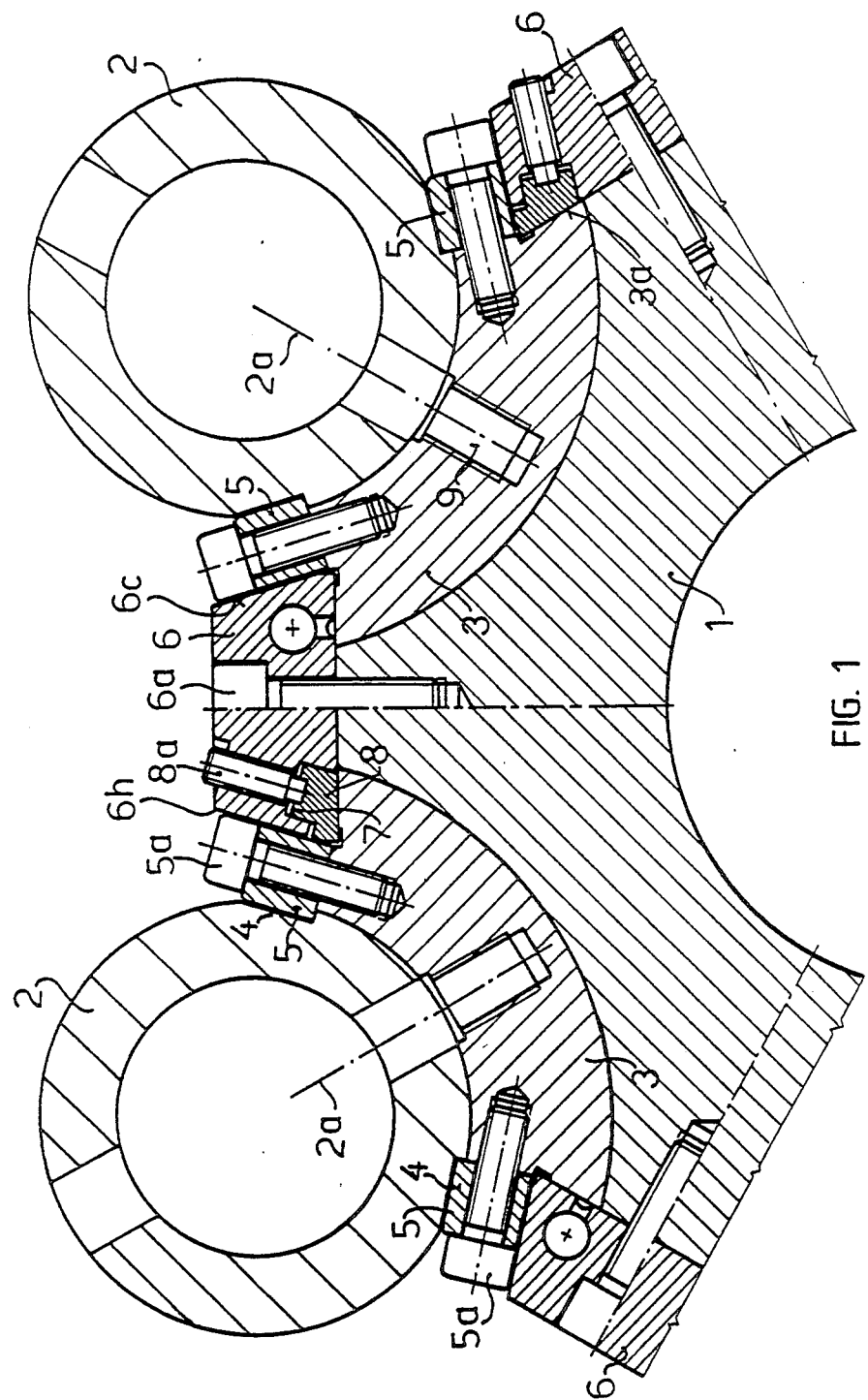
FIG. 1 shows in detail a section through a tool-carrying platform as well as through two spindle-carrying sleeves located next to each other.
Figure 2:
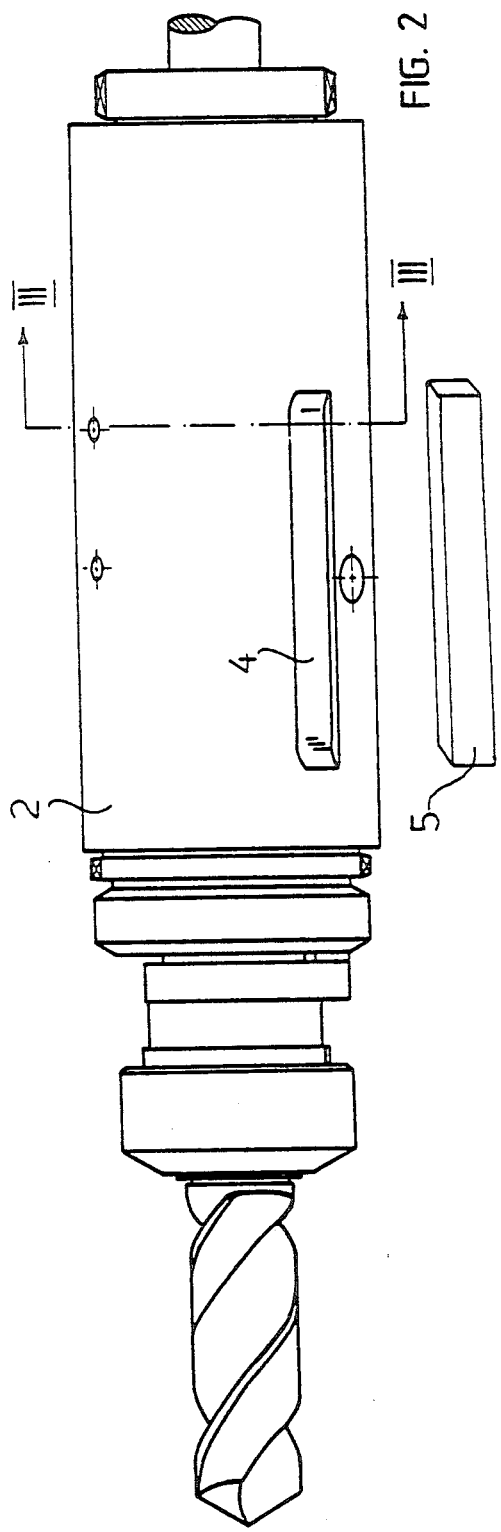
FIG. 2 shows a front view of the spindle-carrying sleeve according to FIG. 1.
Figure 3:
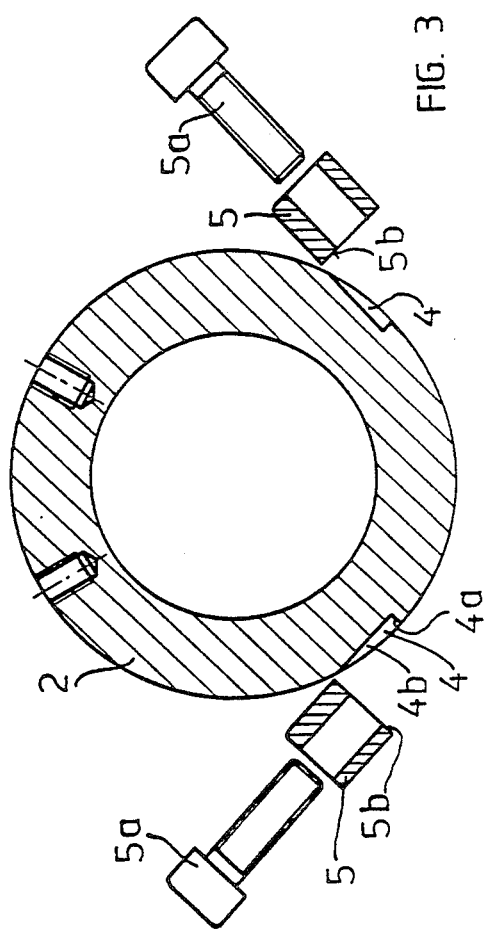
FIG. 3 shows a section along the line III—III through a spindle-carrying sleeve according to FIG. 2.

In the drawings, illustrated for greater clarity on different scales, identical components have identical reference numbers. 1 denotes the body of a receiving chuck or of a platform for simultaneously receiving a plurality of tools, conventional in automatic machine tools. In the drawings, the body 1 of the carrying platform is intended to receive six spindle-carrying sleeves 2. Only two of the tool-carrying sleeves are shown in the drawing. A concave carrying slide 3 or holder is always arranged between the spindle-carrying sleeves and the body 1 of the platform.

As can be seen from the drawings, each spindle-carrying sleeve 2 has in adjacent zones, in the assembled state, parallel to the edges of the concave slide 3, recesses 4 in which there is provided a strip 5 for clamping and securing the sleeve 2 on the associated concave slide 3 by means of screws 5a. The recesses 4 have, in the example of embodiment illustrated, essentially an L-shape, with the shorter side of the L-shaped recesses 4, i.e. the base side 4a, engaging with the bottom side 5b of the clamping strip 5. According to the invention flat presser pieces 6 are provided for securing and retaining the concave slides 3 on the body of the platform 1 by means of screws 6a (see FIG. 1). The presser pieces 6 have, on their bottom side, recesses 7 for the insertion of plate-shaped adjusting devices 8. The adjusting devices 8 can be pressed against the respective longitudinal edges 3a of the associated concave slide 3.

As can be seen in FIG. 1, the adjusting plates 8 can be pressed against the concave slide 3 by means of screws 8a actuatable from the outside.

As can be seen moreover from the drawings, the side surfaces 6b, 6c of the clamping pieces 6 and the longer surface 4b of the L-shaped recess 4 in the spindle-carrying sleeve 2 are oriented, in the assembled state, parallel to each other and along the central longitudinal surface of the screws 5a of the clamping strips 5. In this way, the surfaces 6b, 6c and 4b act as guiding surfaces for the positioning of the clamping strip 5 during assembly of the spindle-carrying sleeves.

According to the invention, along the centre axis of the concave slide 3 there is provided a number of threaded bores 9 which serve to receive screws 2a for securing the spindle-carrying sleeve 2 on the concave slide 3. The number of securing screws 2a can be freely chosen and, in practice, their number is determined by the length of the spindle-carrying sleeve 2. Depending on the length of the carrying sleeve 2, the constructional length envisaged for the recesses 4 on the spindle-carrying sleeve 2 as well as the constructional length for the corresponding clamping strips is also determined. In practice, the recesses 4 could also extend over the entire length of the spindle-carrying sleeve 2 or also several recesses 4 could be provided.

From the preceding description it can be understood that, by means of the clamping device according to the invention, the object underlying the invention is entirely solved and the advantages mentioned in the introductory part of the description are achieved.

Particularly worth mentioning is the simplicity of the components used and the uniformity of clamping of the spindle-carrying sleeves on the platform. The number of components is limited, and the device can be manufactured by mean of simple and few machining operations. It also can be understood that, with the clamping device according to the invention, there are no radially directed forces on the spindle-carrying sleeves 2 and thus there is no deformation of the sleeve 2 and no alteration in the true running of the sleeves. This results in the components provided inside the spindle-carrying sleeve 2 running perfectly true and being able to operate with great precision.

Perfect and precise assembly of the concave slides is moreover possible as a result of the use of adjustable clamping devices.

In practice, all the individual components of the clamping device may be replaced by other kinds of technically equivalent components, without thereby departing from the protective scope of the invention. Thus it would be readily possible to use clamping strips for clamping spindle-carrying sleeves, having a cross-section different from the quadrangular or square cross-section mentioned. The corresponding receiving seats in the spindle-carrying sleeve could also be modified. Furthermore, a different type of design could be envisaged for the clamping strips fixing the concave slides, and another design could be envisaged for the adjusting device or for the receiving seat of these adjusting devices, without thereby departing from the protective scope of the invention.

It should be pointed out, finally, that, as a result of the additional securing arrangement of the spindle-carrying sleeve according to the above invention, i.e. in the radial direction by means of the screws inserted in the threaded bores 9 on the sleeve bottom and in the tangential direction by means of the clamping strip optimum rigidity of the fitted spindle-carrying sleeves and therefore optimum precision of the machining tools used is ensured.

I claim:

1. A device for supporting at least one tool spindle on an automatic machine tool, comprising:

a spindle-carrying sleeve to receive said tool spindle, said sleeve having at least one recess formed along an outer surface of the sleeve;

a receiving chuck having at least one concave seat, formed on an outer portion of said receiving chuck, for supporting each said sleeve;

a spindle-carrying slide arranged between said sleeve and said seat and moveable along a longitudinal axis of said chuck;

at least one presser piece connectable to said chuck by a securing means and being engageable with ends of said slide so as to secure slidingly said slide to said chuck, said presser piece having an adjustment device positioned within a recess in said presser piece, said adjustment device being adjacent at least one end of said slide and actuatable by a drive means to effect movement of the slide;

a clamping strip removeably secured to said end of said slide by locking means and engageable with said recess so as to secure said sleeve to said slide, said clamping strip being positioned between said presser piece and said sleeve; and attachment means, along a center line of the slide, for securing said sleeve to said slide.

2. The device according to claim 1, wherein the clamping strip has a quadrangular cross-section.

3. The device according to claim 1, wherein the adjustment device consists of a strip-type component which is arranged in the recess of the presser piece, lateral surfaces of said recess of said presser piece acting as guiding surfaces for the adjusting device during displacement of the adjustment device.

4. The device according to claim 1, wherein said locking means is a first screw passing through a hole in said clamping strip to engage a hole in the end of said slide, said securing means is a second screw that passes through a hole in said presser piece to engage a hole in said chuck, and wherein said attachment means is at least one third screw that passes through at least one hole in said sleeve to engage at least one bore in said slide.

5. The device according to claim 1, wherein the recess provided in the spindle-carrying sleeve has a substantially L-shaped form in cross-section, and a bottom, narrower side cooperates with a bottom side of the clamping strip for fixing the spindle-carrying sleeve on the slide.

6. The device according to claim 2, wherein said recess is parallel to a longitudinal axis of said sleeve, and wherein lateral surfaces of the presser piece and a longer side of the L-shaped recess of the spindle-carrying sleeve are arranged parallel to each other and to a center axis of the locking means.

* * * * *